United States Patent
Bean et al.

(10) Patent No.: US 11,469,910 B2
(45) Date of Patent: Oct. 11, 2022

(54) PHYSICALLY UNCLONABLE FUNCTION DEVICE

(71) Applicant: TTP Plc, Royston (GB)

(72) Inventors: Edward Leigh Bean, Sawston (GB); Sergey Gaishun, Royston (GB)

(73) Assignee: TTP Plc, Hertfordshire (GB)

( * ) Notice: Subject to any disclaimer, the term of this patent is extended or adjusted under 35 U.S.C. 154(b) by 0 days.

(21) Appl. No.: 16/772,434

(22) PCT Filed: Dec. 12, 2018

(86) PCT No.: PCT/GB2018/053608
§ 371 (c)(1),
(2) Date: Jun. 12, 2020

(87) PCT Pub. No.: WO2019/116032
PCT Pub. Date: Jun. 20, 2019

(65) Prior Publication Data
US 2021/0075628 A1    Mar. 11, 2021

(30) Foreign Application Priority Data

Dec. 15, 2017 (GB) .................................... 1721036

(51) Int. Cl.
*H04L 9/32* (2006.01)
*G06F 21/75* (2013.01)

(52) U.S. Cl.
CPC ............ *H04L 9/3278* (2013.01); *G06F 21/75* (2013.01); *H04L 2209/08* (2013.01)

(58) Field of Classification Search
CPC . H04L 9/3278; H04L 2209/08; H04L 9/0866; H04L 9/32; G06F 21/75
See application file for complete search history.

(56) References Cited

U.S. PATENT DOCUMENTS

| | | | | |
|---|---|---|---|---|
| 6,089,453 A | * | 7/2000 | Kayser .................. | G06Q 30/06 235/462.46 |
| 2006/0003152 A1 | * | 1/2006 | Youngs .................... | H01B 1/22 252/500 |
| 2014/0042628 A1 | * | 2/2014 | Edelstein ................ | H01L 23/52 438/618 |

(Continued)

FOREIGN PATENT DOCUMENTS

| | | |
|---|---|---|
| EP | 2819049 A1 | 12/2014 |
| WO | 2012122994 A1 | 9/2012 |

OTHER PUBLICATIONS

MIT NPL—AEGIS: a single-Chip secure processor. (Note: a pdf copy is attached in the non-final office action) (Year: 2007).*

(Continued)

*Primary Examiner* — Quazi Farooqui
(74) *Attorney, Agent, or Firm* — Erise IP, P.A.

(57) ABSTRACT

A physically unclonable function (PUF) device comprises a plurality of conductors, at least some of which are arranged so that they interact electrically and/or magnetically with one another. A media surrounds at least a portion of each of the conductors, and circuitry applies an electrical challenge signal to at least one of the conductors and for receiving an electrical output from at least one of the other conductors to generate an identifying response to the challenge signal that is unique to the device.

14 Claims, 2 Drawing Sheets

(56) References Cited

U.S. PATENT DOCUMENTS

2016/0267266 A1* 9/2016 Yamamoto ............ H04L 9/3278

OTHER PUBLICATIONS

International Search Report dated Mar. 6, 2019, in International Application No. PCT/GB2018/053608; Filed Dec. 12, 2018; Applicant: TTP PLC.
Written Opinion of the International Searching Authority dated Mar. 6, 2019, in International Application No. PCT/GB2018/053608; Filed: Dec. 12, 2018; Applicant: TTP PLC.

* cited by examiner

PHYSICALLY UNCLONABLE FUNCTION DEVICE

RELATED APPLICATIONS

The present application is a national stage application under 35 U.S.C. § 371 of International Application No. PCT/GB2018/053608, filed 12 Dec. 2018, which claims priority to Great Britain Patent Application No. 1721036.0, filed 15 Dec. 2017. The above referenced applications are hereby incorporated by reference into the present application in their entirety.

FIELD

The present invention relates to a Physically Unclonable Function (PUF) device that maps an input (challenge) to an output (response) that is well-defined but difficult to duplicate or reverse-engineer. The invention has applications within device security, authentication, counterfeit protection and tamper-proofing.

BACKGROUND

Existing Physically Unclonable Functions (PUFs) typically exploit manufacturing differences between identical silicon circuits, however these lack sufficient entropy to be truly unclonable. Alternative PUF types do exist, but these require external read-out circuitry, and are vulnerable to 'black-box' attacks. The proposed invention avoids these issues by providing a novel method of generating an intrinsic response, based on physical characteristics that cannot be easily modelled.

Cryptographic primitives used in encryption assume 3 key features: Secure Key Generation, Secure Key Storage and Secure Execution. Analysis has shown a distinct lack of randomness in commonly used public keys, whilst the contents of said keys can be read directly from non-volatile digital memory even with extensive countermeasures.

Current methods of generating and storing these keys in memory, in such a way that protects them from common types of attack, are both difficult and expensive. PUFs offer new cost-effective ways through which these keys can be securely generated and protected from malicious actors. They were first proposed with a view to identifying individual IC's by their manufacturing defects. PUFs work by generating a key that is unique to the device, based on some physical characteristic of the device itself. The key is generated and read out by challenging the PUF, measuring the response and then performing some form of computation.

As the key is generated by the physical characteristics and manufacturing defects of the device, it should be impossible to create a physical copy or accurately model the response of the system to simulate it in software. If some individual attempts to measure the response of the PUF when subject to a challenge, the response should change sufficiently to invalidate the PUF, and protect the secret contained within the PUF. The lack of interchangeability between the challenges and responses leads to the idea of the Challenge-Response Pair (CRP)—each challenge maps directly to one response.

As the ideal PUF cannot be copied or modelled, it is truly unclonable, and so a key generated or stored by the PUF cannot be illegitimately extracted/copied. Additionally, the generated response must be reproducible, once variations in environmental conditions, such as temperature and humidity are accounted for, and the time to generate a response should be neither too fast (reducing the time required to collect CRPs for a brute force attack) or too slow (reducing the availability of any function relying on the PUF).

PUFs have many applications:

Remote Challenge-Response Authentication: A simple example of this is password authentication, where the challenge is the request and the response the correct password. In the case of a PUF, one or more CRPs would be collected from the device during a registration stage. The device can subsequently be checked for authenticity by issuing a challenge and getting the desired response in return. The correct responses are not stored within the PUF, but are generated as a function of its physical structure, so the PUF is inherently robust to invasive attacks (that may attempt to read stored secrets). Many challenge-response pairs could be registered, so that each pair would only need to be used once (a one-time password), meaning that the system would be robust against replay attacks. The system doesn't require continuous power, or time synchronisation, unlike other 1-time authentication systems.

Encryption Relationship Management: The response of the PUF to a given challenge could be used to form a private encryption key. Again, the key would not be stored within the PUF itself, rendering it robust to invasive attacks.

Encryption Key Storage: Consider a situation where an FPGA is used to perform a custom process, and utilises an encrypted stream requiring the physical storage of a private key. This private key may therefore be vulnerable to a physical attack. By generating the key each time it is required, thus not storing it in electronic memory, the key is no longer vulnerable to unauthorised read-out.

Object Authenticity Verification: In this use-case, the PUF may either be embedded within the object to be verified, with some sort of external readout mechanism. Alternatively, the PUF may entirely enclose the physical object to be protected, and the challenge-response mechanism may be used to either ensure that the enclosed physical object has not be tampered with, or even to provide the code to a physical unlocking mechanism, which requires a complete challenge-response pair to unlock. Any attempt to interfere with the enclosure should change the response of the PUF and then be obvious to the possessor of the correct challenge-response pair(s).

However, current PUFs can either be accurately modelled or lack sufficient entropy to act as a true security layer for secure key storage. PUFs exploiting manufacturing differences within a FPGA are too easily measured using low-cost equipment and modellable; the secure keys generated using initial SRAM states are too easily read-out; and current EM-based PUFS are expensive and/or have a limited number of challenge-response pairs, allowing for potential replay attacks.

Embodiments of the PUF of the invention can solve these issues as:

- The number of Challenge-Response pairs is large, based on the selection of conductors in the PUF, and the signal frequency, phase and amplitude.
- The full challenge-response mechanism can be enclosed within the PUF, preventing external measurement of the PUF properties.
- The PUF cannot be readily modelled due to the complex interaction of the conducting paths embedded within the surrounding media
- The interaction of the conducting paths can be made even more complex and unpredictable in embodiments by using a heterogeneous media having an irregular nature surrounding the conducting paths Any attempt to probe the PUF will affect the measured response.

The PUF can be used to encapsulate any sensitive electronics, reducing the opportunity for an adversary to measure the PUF output.

There are several examples that constitute prior art in the field of PUFs. These show methods to implement PUFs on FPGAs and derive the true response from a noisy output. One example is U.S. Pat. No. 9,390,295, which relates to a capacitive security shield PUF. Whilst the option to choose the paths upon which to measure the response is disclosed in this prior art, the present invention has a greater configurability as it provides a PUF whose challenge can be modulated in frequency, amplitude and phase, increasing the number of possible CRPs and the effective entropy of the device.

SUMMARY

The proposed invention exploits the interaction of multiple conducting paths embedded within a media, such that there exists a complex electrical and magnetic coupling between each permutation of the conducting paths.

The invention exploits the intrinsically complex and unpredictable electrical and magnetic interactions between numerous conductive paths and the media in which they are embedded. A subset of the conductive paths are excited by a modulated signal of selectable amplitude, frequency and phase generating the challenge, and the response is detected on some other paths. The nature of the PUF means that it can also be deployed in a variety of form factors, including enveloping a circuit to be protected. Any attempt to penetrate this protective circuit, or to listen to the challenge-response pairs, will invoke a sufficient change in the electrical and magnetic interaction between conductive paths to invalidate the response of the PUF. The media and arrangement of the conducting paths should be sufficiently different between devices to ensure that each PUF is unique, whilst also maintaining the unpredictability of the PUF response.

In a preferred embodiment, the electrical and magnetic interactions are made more complex through the explicit introduction of heterogeneity in the surrounding media, for example through irregular distribution of some material through at least a part of the surrounding media. An example would be to introduce localised regions of iron filings within the media, however the addition of any suitable conductive, dielectric, ferroelectric, magnetic or ferromagnetic material or localised doping of the media, or combinations thereof, will explicitly introduce heterogeneity into the surrounding media. Further complexity arises from the use of non-linear and/or anisotropic materials thus distributed through the media.

According to the present invention there is provided a physically unclonable function (PUF) device comprising:
a plurality of conductors, at least some of which are arranged so that they interact electrically and/or magnetically with one another;
a media surrounding at least a portion of each of the conductors; and
circuitry for applying an electrical challenge signal to at least one of the conductors and for receiving an electrical output from at least one of the other conductors to generate an identifying response to the challenge signal that is unique to the device.

BRIEF DESCRIPTION OF THE FIGURES

Examples of the present invention will now be described with reference to the accompanying drawings in which.

DETAILED DESCRIPTION

Figure 1:
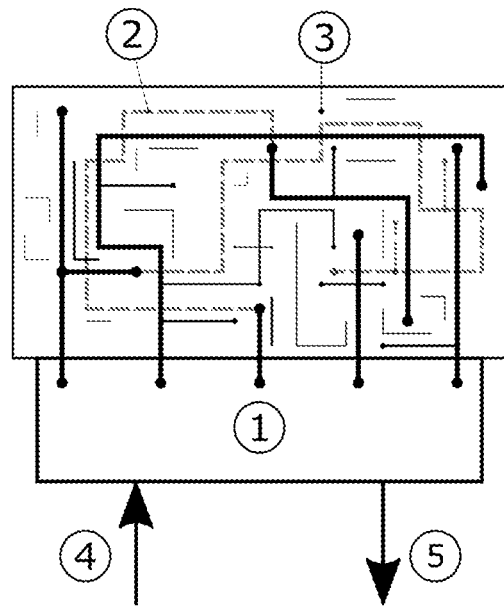
FIG. 1 is a schematic diagram of an example PUF device according to the invention.

FIG. 1 shows a simplified conceptual diagram of the PUF network, with a reduced number (eg. five) of conducting paths 2 spread across two layers (solid black and dashed grey). The surrounding media 3 is, in this example, heterogeneous and is different for each PUF. The PUF interface circuitry 1 applies electrical stimuli to a subset of the conducting paths. The interface circuitry 1 or an external challenge input 4 determines the selection of paths; and amplitude, phase and frequency of the stimuli applied to these paths.

The currents induced, in response to the challenge, within a different subset of conducting paths are received by the circuitry 1 and provide an identifying response 5 which is output from the PUF. The output 5 will be application specific, derived from the behaviour of the PUF 2, 3 and inference by circuitry 1.

Construction of the PUF Element

The conducting paths may be arranged such that all paths have a good probability of interacting in the absence of the heterogeneous media. This arrangement of the conducting paths ensures that the response of the PUF instantiation is unpredictable. The arrangement of the paths may be calculated by an optimisation algorithm whereby the cost function is related to the deviation of the integrated path couplings. The path routing may also be changed between different instantiations of the PUF, provided the integrated coupling along the lengths of each path to all others is sufficient to provoke a complex, non-predictable, tamper-proof response.

The conducting paths may comprise electrically insulated wires overlapping one another; be embedded within a substrate material with vias to allow for overlapping routing; or be formed from a complex media of mixed permittivity, permeability and conductivity. The heterogeneous media surrounding the conductors may then be applied in the form of some setting material such as epoxy, or by 'doping' existing substrate material such as FR4.

PUF Interfacing

The interface circuitry 1 between the PUF device and any application will be application specific. In a digital circuit, the challenge and response may be digital signals, that might be converted into analogue stimuli by the PUF interface. Alternatively, the challenge and response could themselves be analogue, in which case they may not need conversion before being transmitted to the conducting paths.

The circuitry 1 for encoding challenges into the appropriate waveforms may be implemented as an Application Specific Integrated Circuit (ASIC), or by a combination of commercial off-the shelf components enclosed within the effective tamperproof region. This may also provide control access to the PUF, reducing the effectiveness of 'brute force' attacks by limiting the number of challenge-response pair requests within a given period.

Figure 2:
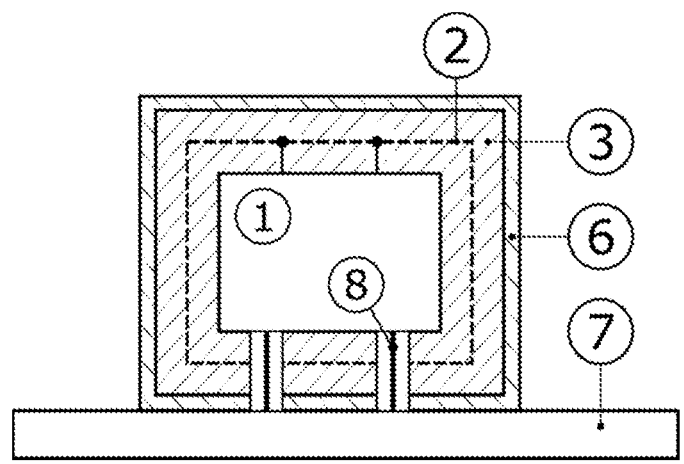
FIG. 2 is a schematic diagram of an example stand-alone PUF device according to the invention.

In one embodiment, the PUF device may be a self-contained, standalone element. This is shown in FIG. 2. In this arrangement, the PUF is protecting the relationship that maps challenges to responses, i.e. the control electronics 1 for the PUF. The PUF interface 1 is contained within the PUF network (the conducting paths 2 in heterogenous media 3). It is difficult to reproduce the precise arrangement and nature of the conducting paths within the heterogeneous media, making it difficult to clone the PUF. Containment 6 may be provided to surround the PUF, and provide physical protection/robustness. This can also include a metallic component/ground plane to inhibit electrical measurement of the PUF. This containment element is not essential to operation of the PUF device however. The PUF device is shown mounted on a supporting structure 7, such as a printed circuit board) for clarity, although this is not key to operation of the PUF, and is not essential. Interconnects 8, pass through the heterogeneous media and containment to the circuit board to allow for communication between the PUF and the application circuit.

Figure 3:
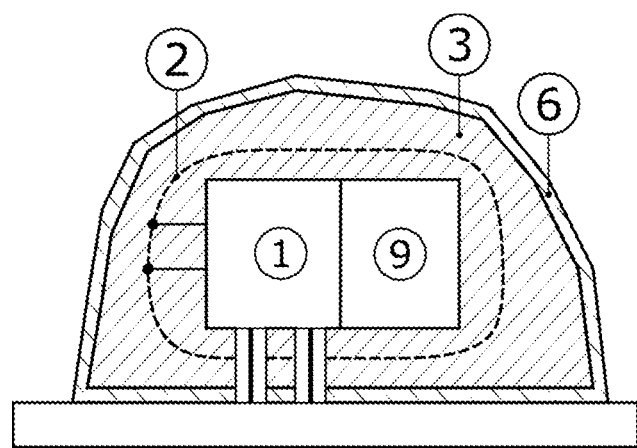
FIG. 3 a schematic diagram of an example PUF according to the invention which encases other components

In another example, the PUF network may be used to fully/partially enclose other elements to provide protection to those elements, this is shown in FIG. 3. The PUF interface 1 and other protected components 9 are contained within the PUF network 2,3. For example, the protected components could be a microprocessor and encrypted storage module. In this case, the PUF can be used to generate the encryption key for the storage module. The PUF network has been formed around the interface electronics and protected components, and is connected to the interface internally. Attempts to disassemble or probe inside the PUF will cause a change in the electrical properties of the PUF network, leading to a change in the response generated for a given challenge, and preventing decryption of the storage module. Communication with the rest of the circuit can then be performed via the interconnects to the PCB.

If the control electronics are embedded within the PUF, they should also include means to correct any errors to ensure a repeatable key is produced within the required response time. This may be fuzzy logic, such as a fuzzy extractor, that ensures that small changes in the physical response (e.g. noise) do not lead to changes in the response. Environmental factors such as temperature are anticipated to have a well-known relationship to the measured response for a given challenge, and may be calibrated out by checking a fixed set of reference keys with known responses that were evaluated at registration.

In both FIGS. 2 and 3, the PUF element is shown as a dashed line to illustrate how it encloses the components to be protected. However, in a practical implementation the conducting paths 2 would extend to the edges of the heterogeneous media 3, with secondary conduction paths (due to the media and any additives) extending throughout the entire volume of the media.

The entire device may be fixed to a solid structure, or made flexible and shaped to the desired form factor for the initial registration process. The material and substrate selection may also be altered to adjust the entropy of the system, and to meet other constraints of the system such as thermal control. The device may then be also enclosed within a ground plane, forming a Faraday cage, to shield the unit from external electromagnetic interference and prevent side-channel attacks on the unit.

In use the PUF is passed a challenge from an external circuit via the PUF Interface 1. The interface 1 converts the request, which could be received as a serial command, to a challenge which can be fed into the PUF device. For example, in an instantiation with ten conducting paths, four may be stimulated with a signal (of varying waveform shape, frequency, amplitude and phase offset), with the response measured on any number of the other six paths. The presence of non-linear materials, such as ferro-magnetics, within the heterogeneous media will introduce a dependency of the response to the amplitude of the challenge. Furthermore, eddy currents within the media will alter the response detected by an individual conductor and introduce a frequency dependence. The amplitude at the given stimulus frequency on each of the response wires is then converted into a response vector, which may then be converted back to a serial stream via the PUF interface 1 and fed back to the circuit. A serial example is provided here, but may also be implemented by a parallel bus or any other electrical interface circuitry.

Between challenges, the number of paths involved in the challenge may change, as may the number of paths used to detect the response. The specific paths used within each challenge may be changed, or kept the same between different challenges. Similarly, the conductors 2 used to detect the response may also change between each challenge.

The frequencies of conductor excitation may be in the audio range, utilising low cost and readily available transmit/receive electronics, or may operate at higher frequencies to develop a more complex electromagnetic interaction in which time delays become significant, and at which physical effects such as the skin effect play a large role in the interaction between the conductors.

If an adversary attempts to probe the PUF device to measure the electrical characteristics of the instantiation, the presence of the probe should cause a sufficient deviation of the response for a given challenge to invalidate the PUF, and render the device temporarily unreadable.

The initial registration process will be dependent on the use of the proposed invention, but is a necessary step to use the PUF device in a practical implementation. For remote authentication, the challenge-response pairs may be queried and stored securely during a registration process. For secure key storage, this is a one time and irreversible procedure.

As previously noted, environmental factors such as temperature may influence the response of the PUF. Factors such as humidity may be mitigated by instantiating the PUF within a hermetically sealed enclosure. Measurements of other parameters, for example by use of a thermocouple in the control ASIC, may then be used in the generation of a challenge to the PUF. Furthermore, the temperature of the PUF can be locally controlled as part of the challenge process, further increasing the difficulty of modelling the PUF device response.

The invention claimed is:

1. A physically unclonable function (PUF) device comprising:
   a plurality of conductors, at least some of which are arranged so that they interact electrically and/or magnetically with one another;
   a media surrounding at least a portion of each of the conductors; and
   circuitry for applying an electrical challenge signal to at least one of the conductors and for receiving an electrical output from at least one of the other conductors to generate an identifying response to the challenge signal that is unique to the device, wherein the electrical output is received in response to the challenge signal,
   wherein the circuitry for applying the challenge signal is arranged to vary the number of conductors to which the challenge signal is applied and/or the number of conductors from which the identifying response is received after each challenge signal is applied.

2. A device according to claim 1, wherein the conductors comprise electrically insulated wires overlapping one another; are embedded within a substrate material with vias to allow for overlapping routing; or are formed from a complex media of mixed permittivity, permeability and conductivity.

3. A device according to claim 1, wherein the circuitry for applying the challenge signal is arranged to vary the conductors to which the challenge signal is applied and/or the conductors from which the response is received after each challenge is applied to the device.

4. A device according to claim 1, wherein the circuitry is arranged to control at least one of the frequency, amplitude and phase of the challenge signal.

5. A device according to claim 1, further comprising means to vary the temperature of the device and in which the circuitry generates an identifying response which varies with the temperature of the device.

6. A device according to claim 1, wherein the circuitry is encased within the media encompassing the conductors.

7. A device according to claim 1, wherein the said circuitry is arranged to apply at least a second electrical challenge signal to at least one of the conductors and to receive at least a second electrical output from at least one of the other conductors to generate an identifying response to the challenge signal that is unique to the device.

8. A device according to claim 7, wherein the second electrical challenge signal is applied to a different set of conductors than the first electrical challenge.

9. A device according to claim 8, wherein the second electrical output is received from a different set of conductors than the first electrical output.

10. A device according to claim 1, wherein the electrical and/or magnetic characteristics of at least a region of the media are heterogeneous.

11. A device according to claim 10, wherein the heterogeneity is created through the irregular distribution of a material through said region of the media.

12. A packaged, single-chip, component comprising the device of claim 1.

13. A multi-chip module, or system-in-package module comprising the device of claim 1.

14. A tamper-proof electronic sub-assembly comprising the device of claim 1.

* * * * *